April 25, 1950 C. G. R. NORDSTROM 2,505,625
REMOVABLE TIP ELECTRIC SOLDERING IRON
Filed March 14, 1946 5 Sheets-Sheet 2
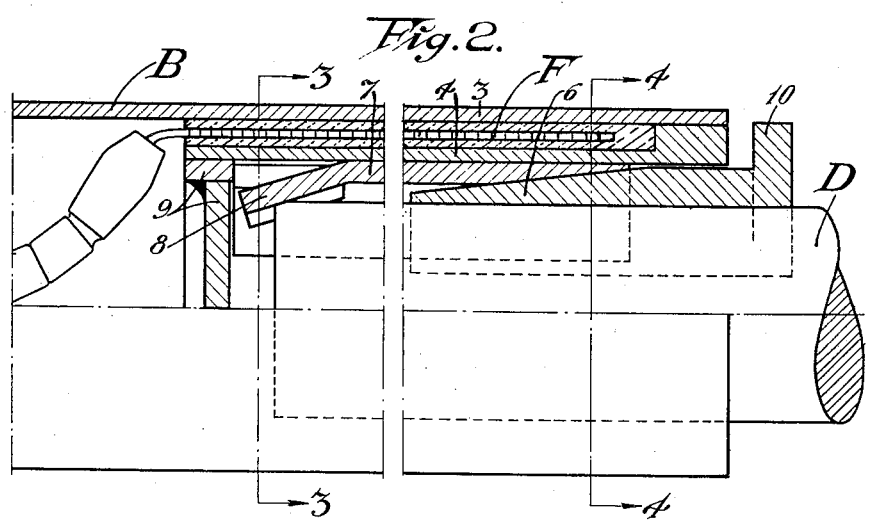
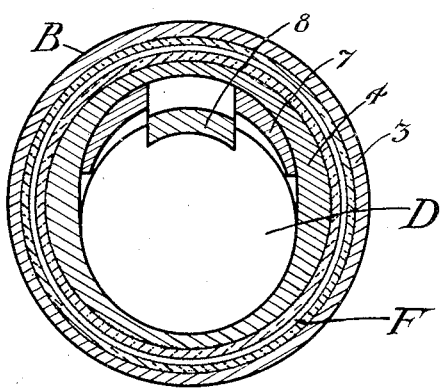
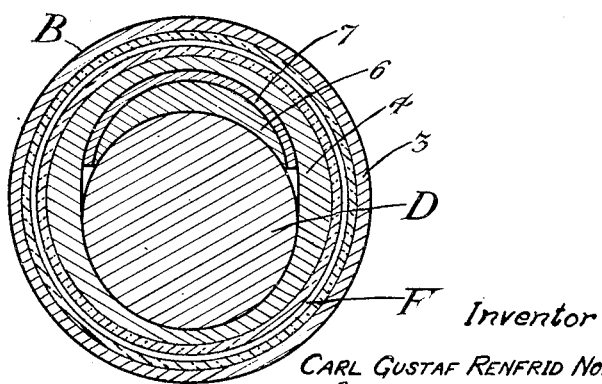
Inventor
CARL GUSTAF RENFRID NORDSTROM
By Haseltine, Lake & Co.
Attorneys

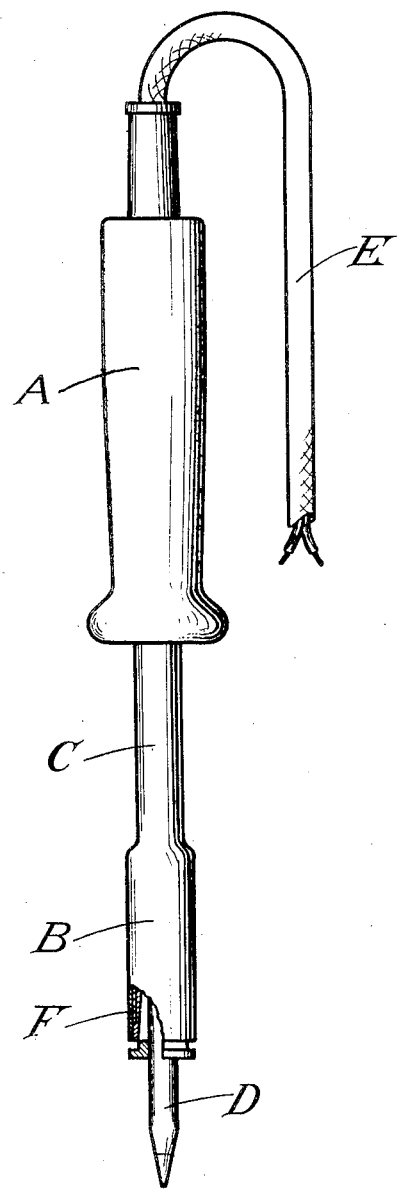

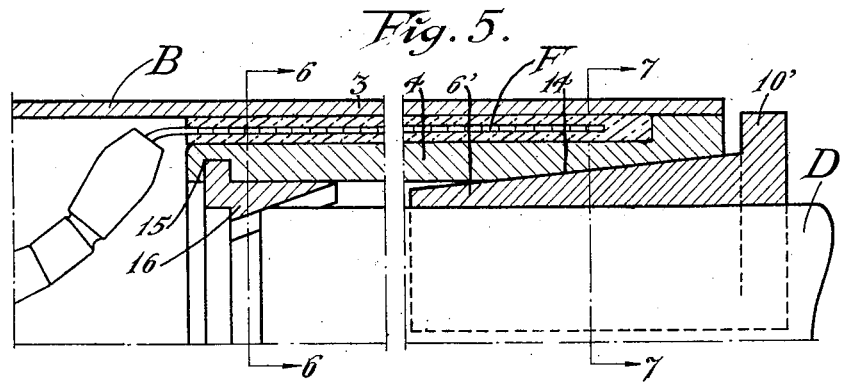
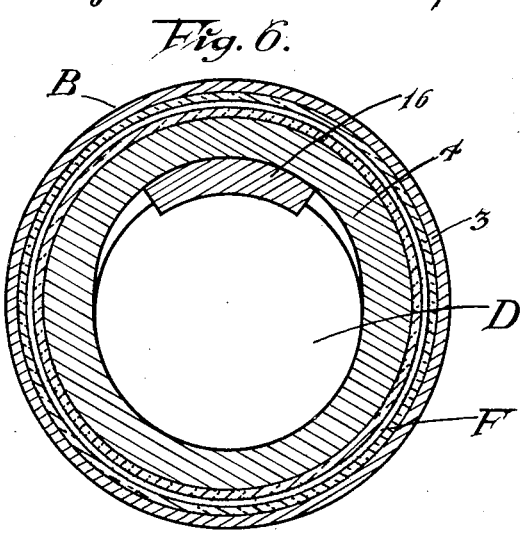
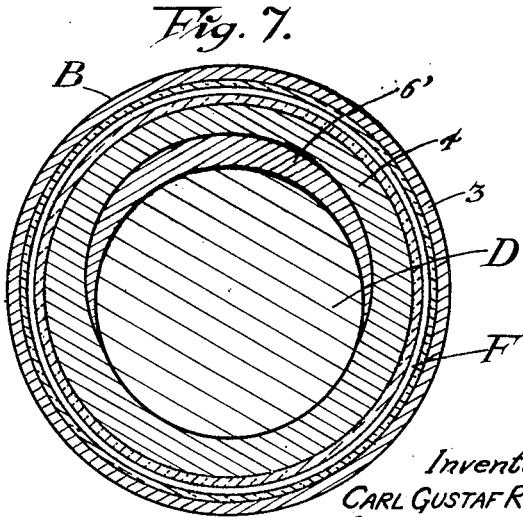

Inventor
CARL GUSTAF RENFRID NORDSTROM
By Haseltine, Lake & Co.
Attorneys

April 25, 1950     C. G. R. NORDSTROM     2,505,625
REMOVABLE TIP ELECTRIC SOLDERING IRON
Filed March 14, 1946

Inventor
CARL GUSTAF RENFRID NORDSTROM
By
Haseltine, Lake & Co.
Attorneys

Patented Apr. 25, 1950

2,505,625

UNITED STATES PATENT OFFICE 2,505,625

REMOVABLE-TIP ELECTRIC SOLDERING IRON

Carl Gustav Renfrid Nordström, Stockholm, Sweden

Application March 14, 1946, Serial No. 654,273
In Sweden March 29, 1945

3 Claims. (Cl. 219—26)

The present invention refers to an arrangement in electric soldering-irons, wherein a substantially rod-shaped bolt or so-called point is attachable in a sleeve-shaped casing provided with an electric heating wire, said casing being suitably connected with a handle adapted for the manipulation of the tool. In soldering-irons of this type, the soldering point is subjected to wear, depending generally on chemical corrosion from soldering agents. The point thus requires to be replaced by another one from time to time. It has been found, however, that the soldering points become so rigidly connected to the casing owing to accumulation of oxide or so-called slag on the attached part as to permit of loosening from the casing only with difficulty or only by deformation of the casing. The exchange of the soldering points must of course only take a few minutes, if the soldering-iron is to be regarded as serviceable for industrial use. Owing to the slag coating, however, the bolts will sometimes have to be sent to special shops for the purpose of exchanging the points. Add to this that industries, where electric soldering-irons are comprised in the tool equipment, are themselves desirous of manufacturing the points of the soldering-irons. For this reason it has been found convenient to make use of points from a rod-shaped material of a circular cross section.

The invention obviates the above-mentioned drawbacks originating from the slag coating with the maintenance of points manufactured from rod-shaped bodies. This is substantially attained by the fact that the point, together with a filling body in the form of a bar or sleeve detachably secured along the point, fills the hollow space of the casing, said filling body being adapted to be removed from the casing, before an exchange of points can take place.

Figure 8:
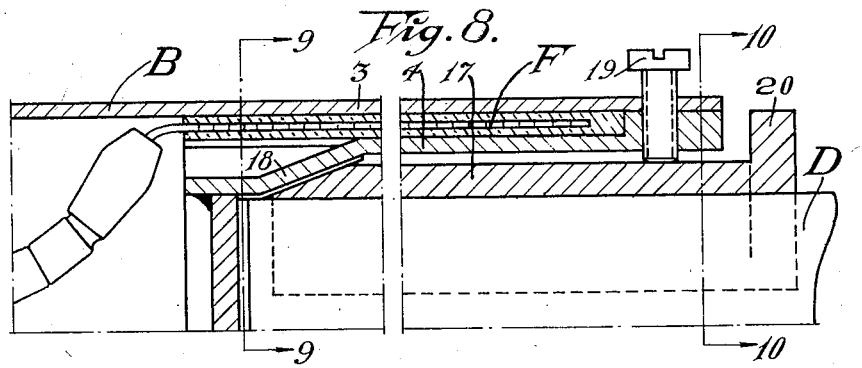
Figure 9:
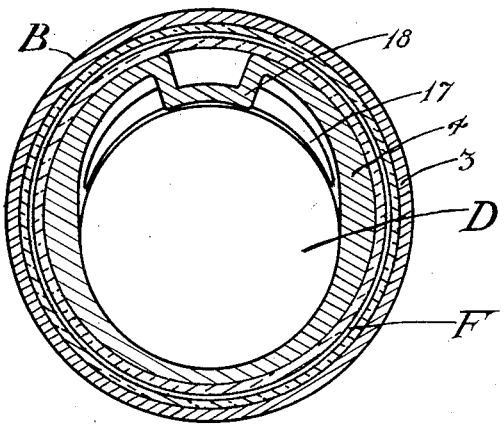
Figure 10:
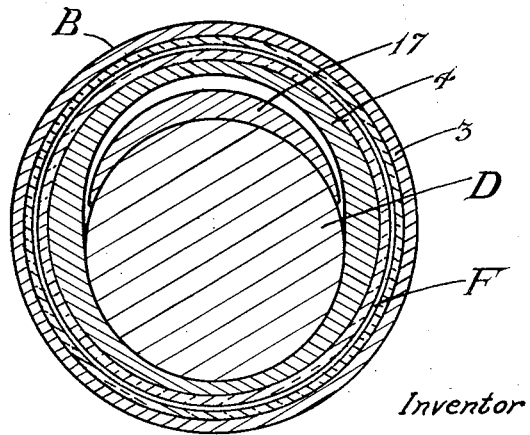
Figure 11:
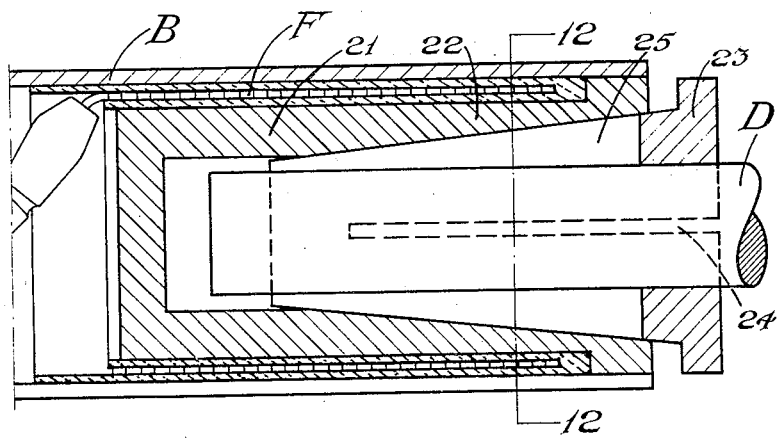
Figure 12:
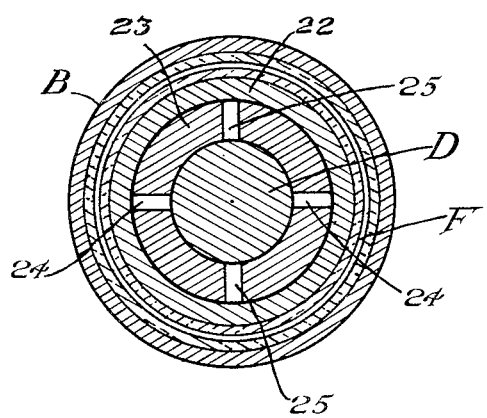

The accompanying drawings illustrate examples of embodiment according to the invention. Fig. 1 is an elevation of an electric soldering-iron with a handle and a portion of an electric supply cable secured thereto. Fig. 2 is a partly section elevation of the heating wire casing of the bolt with a portion of a soldering point inserted therein. Fig. 3 is a cross section on line 3—3 in Fig. 2. Fig. 4 is a cross section on line 4—4 in Fig. 2. Fig. 5 shows a second embodiment represented as in Fig. 2. Figs. 6 and 7 are cross sections on lines 6—6 and 7—7, respectively, in Fig. 2. Fig. 8 shows a third embodiment represented as in Fig. 2. Figs. 9 and 10 are cross sections on lines 9—9 and 10—10, respectively. Fig. 11 is an axial section through a fourth embodiment, and Fig. 12 is a cross section on line 12—12 in Fig. 11.

In the soldering-iron shown in Fig. 1, all parts, i. e. the handle A, the heating wire casing B, and a shank portion C connecting the two first-mentioned parts, are constructed in known manner, save for the interior of the casing B, which is formed in accordance with the invention. The bolt or point D proper is made cylindrical with a circular cross section, and is chisel-shaped at the outer end thereof. The point may thus be simply manufactured from a round rod, for instance from copper or a copper alloy. The supply cable of the soldering-iron, which is designated by E, is connected in an arbitrary suitable manner to a heating wire winding F in the casing B.

In the form of embodiment shown in Figs. 2-4, the heating wire casing B consists of an outer jacket 3 and an inner jacket 4, between which the heating wire winding F is arranged. As will appear from Figs. 3 and 4, the point D bears along the lower half of its cylindrical surface directly on the inner jacket 4, whereas the upper half of said surface is in heat conductive connection with the casing through the agency of two wedge-shaped filling bodies 6 and 7. The body 6 is made with a crescent-shaped cross section, the inner and outer surfaces thereof constituting circular cylinder surfaces. Said body tapers inwardly and is arranged to co-operate with the inner surface of the body 7, which latter tapers outwardly. Owing to the wedge effect between these bodies, a good heat contact is obtained for the point D. To ensure proper bearing also at the inner end of the point, the body 7 is formed in this place with a tongue 8 forming a guide surface, which is positioned obliquely relatively to the point. A bottom 9 in the casing F forms a stop for the filling body 7 when the point D is introduced. The body 6 as well as the body 7 may be arranged on the point, when the latter is introduced into the casing. When the point is to be removed from the casing, the filling body 6 is removed first, said body being for this purpose formed with a flange 10 adapted to be actuated by means of a hammer, chisel or the like. Obviously, the body 6 may also be loosened with the aid of a pair of tongs or a vise. Upon the removal of the body 6, the point may be readily taken out of the casing. The filling bodies are preferably made from metal of good heat conducting properties. On account of the fact that the point is in contact with heat conducting surfaces under a great pressure, an effective transfer of the heat will be obtained.

The modification shown in Figs. 5–7 differs from the embodiment above described substantially by the fact that the filling body 7 has been omitted, while the inner jacket 4 has been formed with a funnel-shaped inner surface corresponding to the taper of a filling body 6' constructed broadly in the same manner as the body 6 in the construction shown in Fig. 2. The body 6', which may be removed from the casing by the actuation of a flange 10', provides for a perfect heating contact at the outer part of the casing. At the inner part of the casing, a body 16 is secured in a groove 15, said body having the same function as the inwardly bent tongue 8 in Fig. 1, so that the inner portion of the point will also be pressed to bear properly on the heating wire casing.

The embodiment shown in Figs. 8–10 differs from the one described substantially by the fact that the filling body is constituted by a rod-shaped filling bar 17 arranged along the portion of the point D introduced into the casing. The inner end of the bar may be bevelled off, however, to cooperate with a portion 18 of the inner jacket 4 positioned obliquely relatively to the axis of the point. For the purpose of ensuring the requisite bearing pressure at the mouth portion of the casing, the filling bar 17 is adapted to be pressed against the point by means of a screw 19 introduced radially through the edge portion of the casing. An exchange of the soldering point is effected upon loosening of the screw 19 and removal of the bar 17, which may be provided for this purpose with a flange 20 on the portion thereof projecting outside the casing B.

Finally, Figs. 11 and 12 show a construction, wherein the inner contact surface of the heating wire casing is purely conical and thus of a simpler geometrical shape than in the examples described above. The inner wall 21 of the heating casing is made of a comparatively great wall thickness at the inner portion, and is formed with an outer funnel-shaped portion 22 adapted to receive a conical filling body 23. This body is formed with a cylindrical aperture adapted to receive the point D. For the purpose of ensuring a perfect bearing contact between the point and the body 23, the latter is provided with slits 24 and 25 in two mutually perpendicular axial planes, said slits extending alternately from the outer and the inner end.

What I claim is:

1. An electric soldering iron comprising a hollow substantially cylindrical casing provided with electric heating wire and a substantially rod-shaped soldering point held in said casing and protruding partly therefrom, in which a portion only of the interior surface of said casing bears against said point and the remaining portion is spaced therefrom by a removable heat conducting wedge-like filler consisting of two separable parts, longitudinally and oppositely tapered, arranged within the space between said remaining portion and said point, said filler pressing the diametrically opposed part of said point at the outer and inner ends of the casing against said casing to cause good heat conduction, the one part of the filler being adapted to be readily removed from said casing to enable the said point to be exchanged without difficulty.

2. In an electric soldering iron, a hollow cylindrical casing, a substantially rod-shaped point in said casing, wherein a portion only of the interior surface of said casing bears against said point, a removable two part wedge in the space between the remaining portion of said point and said casing, said wedge being crescent shape in cross section, one part pressing against said point tapering inwardly and arranged to cooperate with the second part of said wedge which tapers outwardly.

3. Soldering iron, as claimed in claim 1, in which the second part of said wedge is provided with a tongue positioned obliquely with respect to said point, said tongue acting as a guide and bearing against the inner end of said point.

CARL GUSTAV RENFRID NORDSTRÖM.

REFERENCES CITED

The following references are of record in the file of this patent:

UNITED STATES PATENTS

| Number | Name | Date |
| --- | --- | --- |
| 269,608 | Wain | Dec. 26, 1882 |
| 618,639 | Bullard | Jan. 31, 1899 |
| 1,308,994 | Rohne | July 8, 1919 |
| 1,316,368 | Hand et al. | Sept. 16, 1919 |
| 1,378,091 | Carlsen | May 17, 1921 |
| 2,064,645 | Abott | Dec. 15, 1936 |